(12) United States Patent
Sayers

(10) Patent No.: US 9,821,616 B1
(45) Date of Patent: Nov. 21, 2017

(54) VEHICULAR HITCH MOUNTED WINCH

(71) Applicant: William Sayers, Orlando, FL (US)

(72) Inventor: William Sayers, Orlando, FL (US)

( * ) Notice: Subject to any disclaimer, the term of this patent is extended or adjusted under 35 U.S.C. 154(b) by 31 days.

(21) Appl. No.: 14/977,777

(22) Filed: Dec. 22, 2015

(51) Int. Cl.
*B60D 1/18* (2006.01)
*B60D 1/52* (2006.01)

(52) U.S. Cl.
CPC ............. *B60D 1/187* (2013.01); *B60D 1/52* (2013.01)

(58) Field of Classification Search
CPC .......... B60D 1/07; B60D 1/075; B60D 1/155; B60D 1/52; B60D 1/01; B60D 1/141; B60D 1/143; B60D 1/167; B60D 1/187; B60D 1/465; B60D 1/185; B60D 1/485; B60G 2204/143; B60P 3/1033; B66D 1/00; B60Q 1/305
See application file for complete search history.

(56) References Cited

U.S. PATENT DOCUMENTS

| | | |
|---|---|---|
| 3,900,214 A | 8/1975 | Brockelsby |
| 5,072,962 A | 12/1991 | Webb |
| 5,085,408 A * | 2/1992 | Norton .................. B60P 3/1033 254/325 |
| 5,588,633 A | 12/1996 | McCrerie |
| 5,884,930 A | 3/1999 | Cluth |
| 6,511,089 B1 * | 1/2003 | Kores, Sr. ................ B60D 1/40 280/478.1 |
| D682,750 S | 5/2013 | Smith |
| 8,640,936 B2 | 2/2014 | Ort |
| 2008/0272699 A1 * | 11/2008 | Capenos .............. B60Q 1/0088 315/77 |
| 2011/0248228 A1 | 10/2011 | Gause |

FOREIGN PATENT DOCUMENTS

WO  WO9314015 A1  7/1993

* cited by examiner

Primary Examiner — Hargobind S Sawhney
(74) Attorney, Agent, or Firm — Kyle A. Fletcher, Esq.

(57) ABSTRACT

The vehicular hitch mounted winch is a winch mounting system for vehicles. The vehicular hitch mounted winch provides a structure upon which a winch is mounted. The vehicular hitch mounted winch is readily attached to the trailer hitch of an automobile and can be readily removed. The vehicular hitch mounted winch has mounted on it a plurality of lights that can be used to light the work area where the winch is in use. The vehicular hitch mounted winch also has a hitch receiver, which allows the use of a trailer when the vehicular hitch mounted winch is attached to the vehicle. The vehicular hitch mounted winch comprises an adapter post, a receiving post, a mounting platform, and a plurality of lights.

12 Claims, 4 Drawing Sheets

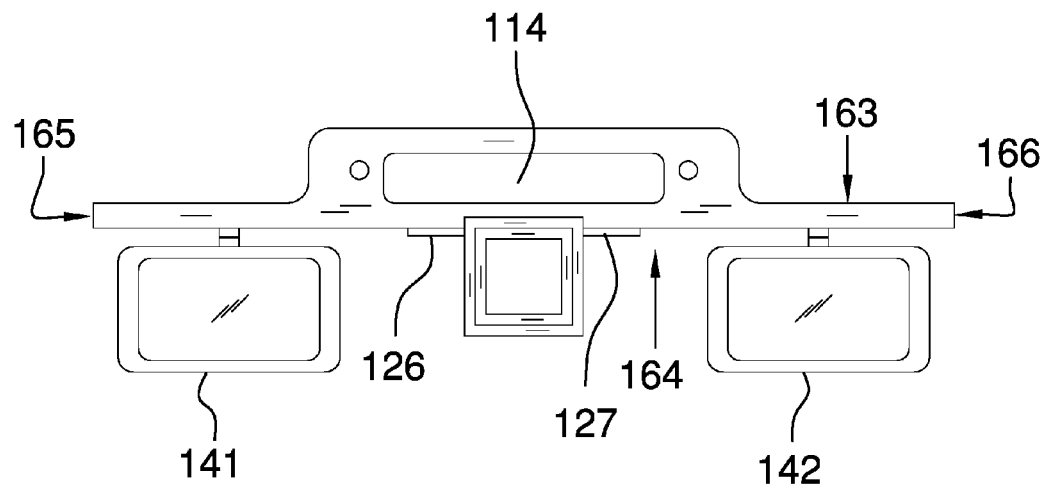
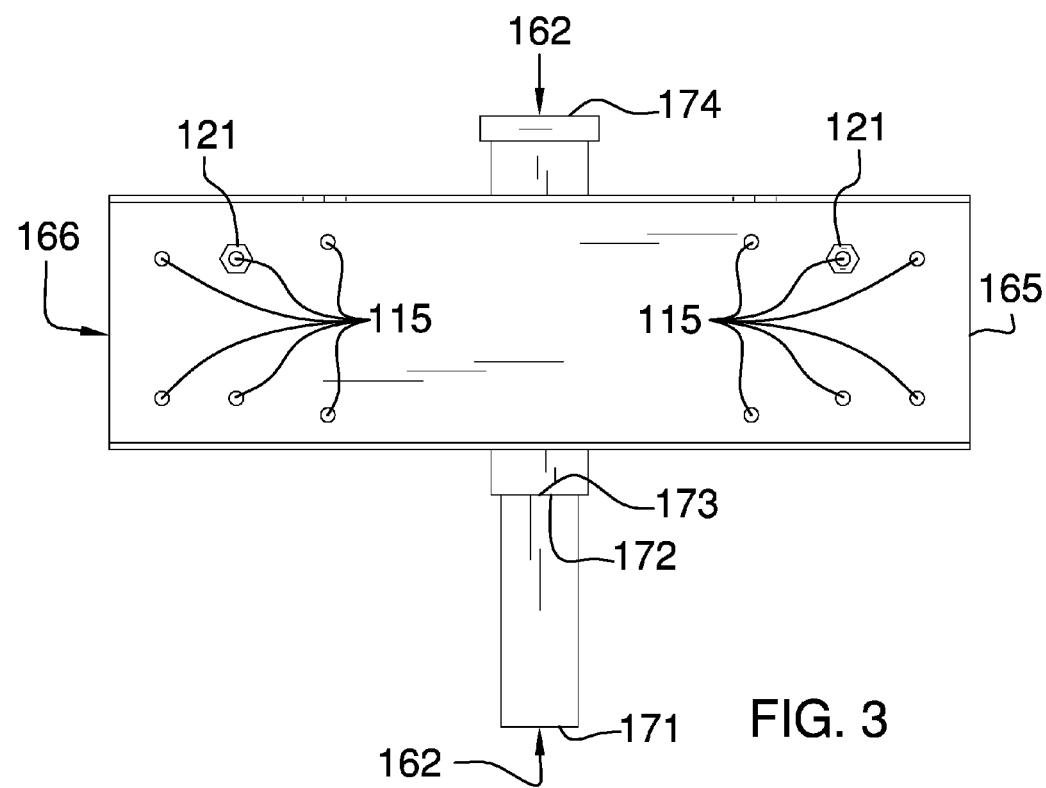

VEHICULAR HITCH MOUNTED WINCH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of supplementary vehicle fittings for carrying loads, more specifically, a trailer mounted structure adapted for use with winches.

SUMMARY OF INVENTION

The vehicular hitch mounted winch is a winch mounting system for vehicles. The vehicular hitch mounted winch provides a structure upon which a winch is mounted. The vehicular hitch mounted winch is readily attached to the trailer hitch of an automobile and can be readily removed. The vehicular hitch mounted winch has mounted on it a plurality of lights that can be used to light the work area where the winch is in use. The vehicular hitch mounted winch also has a hitch receiver which allows the use of a trailer when the vehicular hitch mounted winch is attached to the vehicle.

These together with additional objects, features and advantages of the vehicular hitch mounted winch will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular hitch mounted winch in detail, it is to be understood that the vehicular hitch mounted winch is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular hitch mounted winch.

It is therefore important that the claims be regarded as including such equivalent construction insofar as they do not depart from the spirit and scope of the vehicular hitch mounted winch. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a front view of an embodiment of the disclosure.

FIG. 3 is a top view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
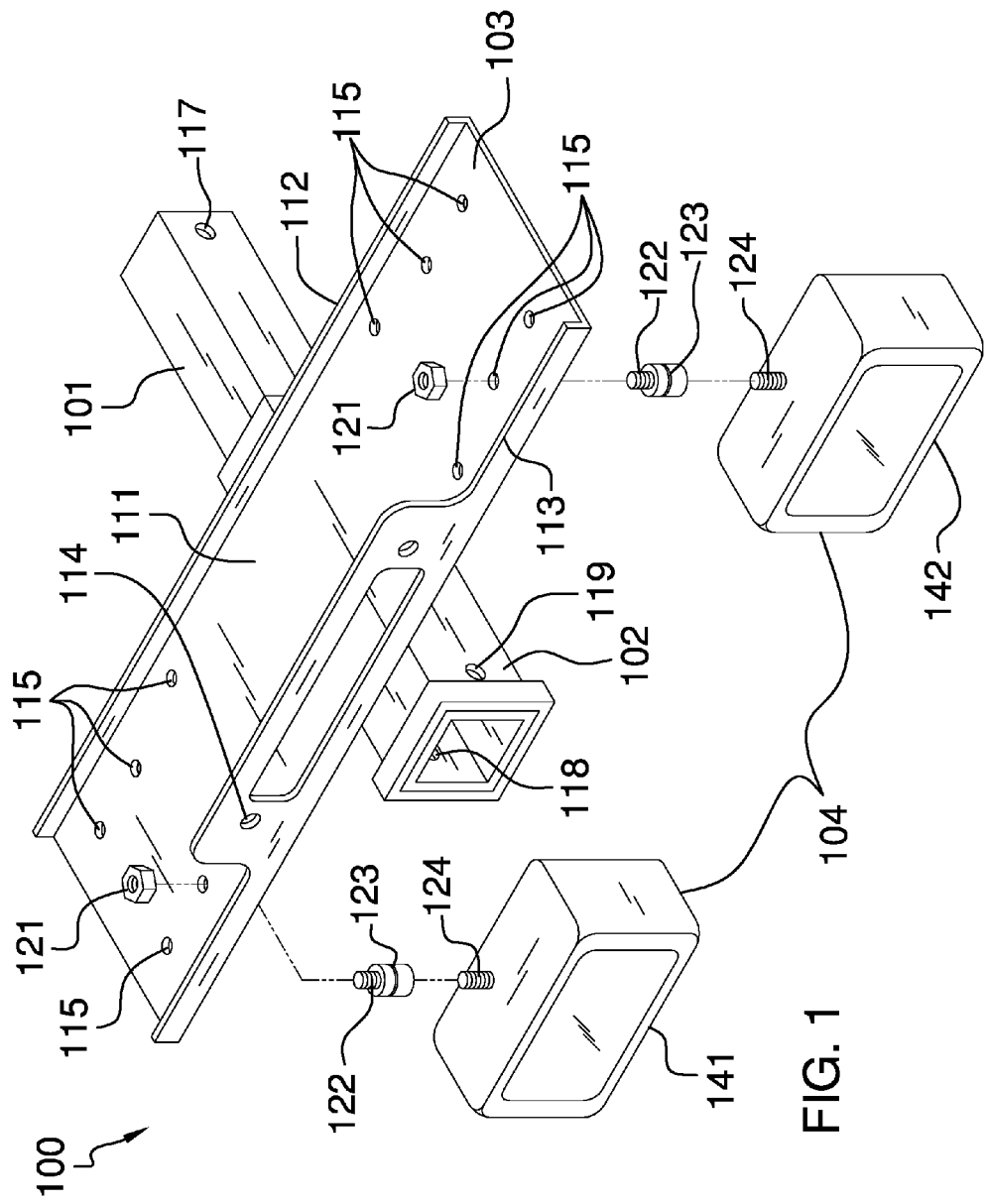
FIG. 1 is a perspective view of an embodiment of the disclosure.
Figure 4:
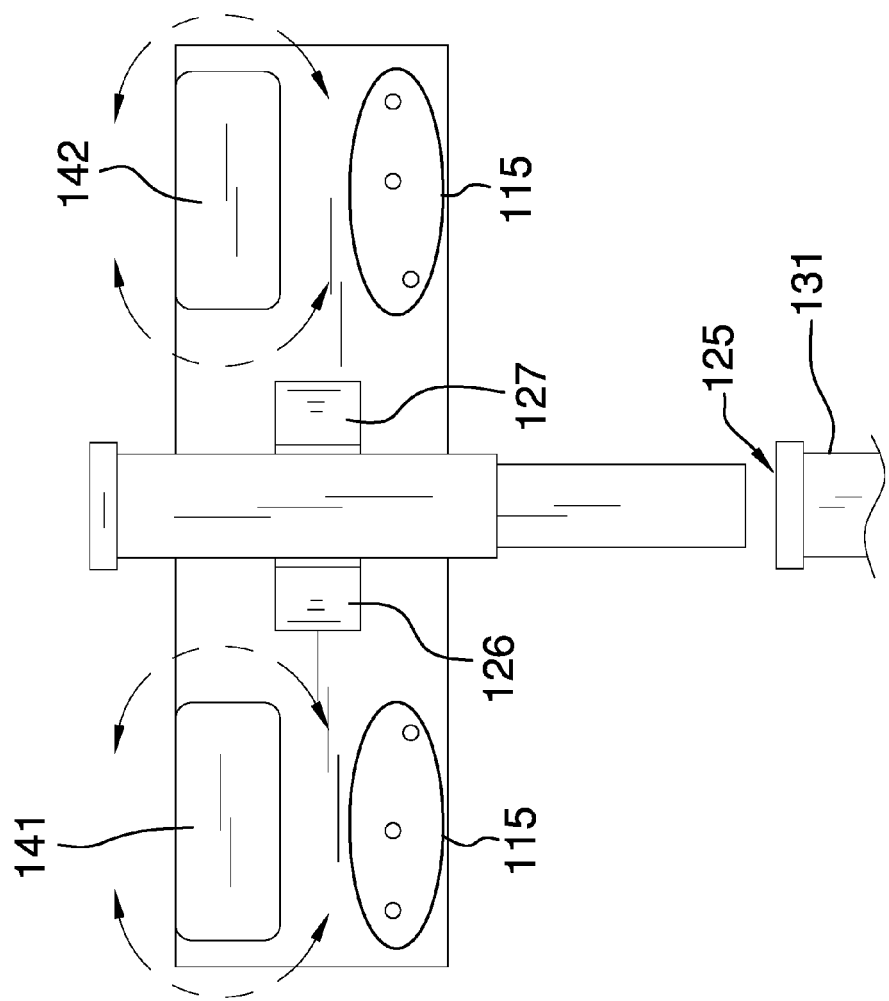
FIG. 4 is a bottom view of an embodiment of the disclosure.
Figure 5:
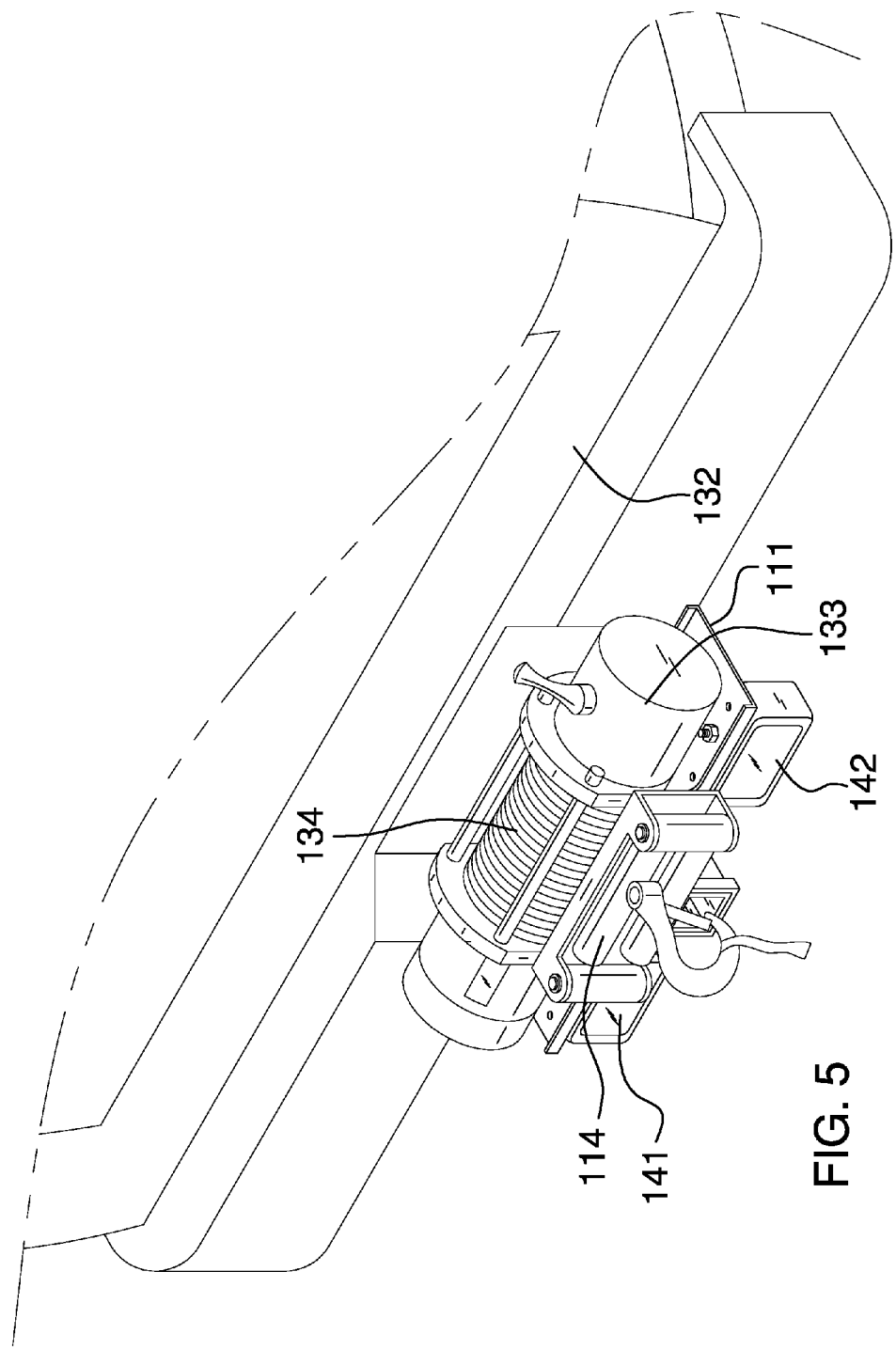
FIG. 5 is an in use view of an embodiment of the disclosure.

Detailed reference will now be made to a first potential embodiment of the disclosure, which is illustrated in FIGS. 1 through 5.

The vehicular hitch mounted winch 100 (hereinafter invention) comprises an adapter post 101, a receiving post 102, a mounting platform 103, and a plurality of lights 104. The invention 100 is adapted for use with a trailer hitch 131 receiver 135 that is attached to a vehicle 132. The invention 100 provides a structure upon which a winch 133 is mounted. The invention 100 is readily attached to and removed from the trailer hitch 131 of a vehicle 132. The invention 100 has mounted on it a plurality of lights 104 that can be used to light the work area where the winch 133 is in use. The invention 100 has a trailer hitch 131 receiver 135, which allows the use of a trailer when the invention 100 is attached to the vehicle 132.

The adapter post 101 is a square tube. The adapter post 101 is further defined with a first end 171 and a second end 172. The outer dimensions of the adapter post 101 is less than the inner dimensions of a standard trailer hitch 131 receiver 135 that is attached to a vehicle 132 such that the adapter post 101 will fit into the standard trailer hitch 131 receiver 135. The adapter post 101 has formed in it a left adapter hole and a right adapter hole 117. The left adapter hole and the right adapter hole 117 are sized to match the corresponding holes provided with a standard trailer hitch 131 receiver 135.

When the adapter post 101 is inserted into the standard trailer hitch 131 receiver 135 such that the left adapter hole and the right adapter hole 117 are aligned with the corresponding holes provided with a standard trailer hitch 131 receiver 135, the adapter post 101 can be secured in place by inserting a pin through the left adapter hole and the right adapter hole 117 are aligned with the corresponding holes provided with a standard trailer hitch 131 receiver 135. The pin is then held in place with a clip that prevents the pin from working loose from the adapter post 101. The pins and clips used by standard trailer hitch 131 receivers 135 are well known in the art.

The receiving post 102 is a square tube. The receiving post 102 is further defined with a third end 173 and a fourth end 174. The inner dimensions of the receiving post 102 is greater than the outer dimensions of the adapter post 101. This allows the adapter post 101 to fit into the receiving post 102. The receiving post 102 is sized such that the inner dimensions of the receiving post 102 are the same size as the inner dimensions of the receiver 135 of the trailer hitch 131 such that a hitch adapter can be attached to the receiving post 102 in the same manner as a hitch adapter would be attached to receiver 135 of the trailer hitch 131. The receiving post 102 has formed into it a left receiver hole 118 and a right receiver hole 119 near the fourth end 174. The left receiver hole 118 and a right receiver hole 119 are there to accommodate the use of a pin and clip for attaching the hitch adapter. To join the adapter post 101 to the receiving post 102, the second end 172 of the adapter post 101 is inserted into the third end 173 of the receiving post 102 and are then permanently attached to each other.

The mounting platform 103 is a structure that provides a supporting structure 111 upon which the winch 133 is mounted. The mounting platform 103 comprises the supporting structure 111, a front ridge 112, a rear ridge 113, and a cable opening 114. The supporting structure 111 is a plate upon which the winch 133 will be mounted. The supporting structure 111 further comprises a plurality of mounting holes 115. The position of the plurality of mounting holes 115 is such that a winch 133 can be moored to the supporting structure 111 using commercially available bolts, nuts, and washers. The plurality of mounting holes 115 further comprises additional mounting holes that are positioned to accommodate winches of differing makes and models. Each of the plurality of lights 104 will be attached using a mounting hole selected from the plurality of mounting holes 115. The plurality of lights 104 is discussed elsewhere in this disclosure.

The front ridge 112 is a rim that runs along the front 161 edge of the supporting structure 111. The purpose of the front ridge 112 is to prevent the winch 133 from shifting off the supporting structure 111 during installation. The rear ridge 113 is a rim that runs along the rear 162 edge of the supporting structure 111. The purpose of the rear ridge 113 is to prevent the winch 133 from shifting off the supporting structure 111 during installation. The cable opening 114 is a slot that is formed in a rectangular projection that projects away from the rear ridge 113 such that the plane of the cable opening 114 is perpendicular to the supporting structure 111. The cable 134 of the winch 133 is routed through the cable opening 114. The purpose of the cable opening 114 is to help prevent the cable 134 of the winch 133 from fouling and to prevent fouled cable 134 from being wound on the winch 133.

The supporting structure 111 is attached to the receiving post 102 using a first L bracket 126 and a second L bracket 127. A first leg of the first L bracket 126 is attached to the bottom 164 surface of the supporting structure 111. A first leg of the second L bracket 127 is attached to the bottom 164 surface of the supporting structure 111. The second leg of the first L bracket 126 is attached to the side of the receiving post 102. The second leg of the second L bracket 127 is attached to the side of the receiving post 102 that is distal to the side of the receiving post 102 where the second leg of the first L bracket 126 was attached. The first L bracket 126 and second L bracket 127 are positioned such that the receiving post 102 is perpendicular to the front ridge 112 and the rear ridge 113 of the supporting structure 111.

The plurality of lights 104 provides area lighting to allow for usage of the winch 133 at night. Each of the plurality of lights 104 is a commercially available LED off road spotlight. Each LED off road spotlight is swivel mounted to the bottom 164 surface of the supporting structure 111 to allow for adjusting the location of each light. The swivel mount comprises a nut 121, a threaded rod 122 and a ball and socket joint 123. The threaded rod 122 is a shaft that is formed with an exterior screw thread. The threaded rod 122 is inserted through one of the plurality of mounting holes 115 and is held in position using the nut 121. The nut 121 is commercially available hardware that is sized to screw on to the threaded rod 122. The ball and socket joint 123 is attached to the end of the threaded rod 122 that is distal from the supporting structure 111. The end of the ball and socket joint 123 that is distal from the threaded rod 122 is then attached to the LED off road spotlight using a threaded connection 124.

In the first potential embodiment of the disclosure, the plurality of lights 104 further comprises a first light 141 and a second light 142.

To use the invention 100, the invention 100 is assembled as described above. The invention 100 is then attached to the trailer hitch 131 of the vehicle 132 as described above. The winch 133 is then attached to the invention 100 as described above. The cable 134 of the winch 133 is threaded through the cable opening 114. The winch 133 can then be used normally. If desired, once the winch 133 is attached to the supporting structure 111, the invention 100 can be detached from and reattached to the trailer hitch 131 without removing the winch 133.

All the components discussed in this disclosure are made of metal. Suitable metals include, but are not limited to, iron, aluminum, or steel. Steel is preferred. In the first potential embodiment of the disclosure, unless otherwise stated, all joinings or attachments are welded. Methods to wire the winch 133 and the plurality of lights 104 into the electrical system of the vehicle 132 are well known and documented in the art.

The following definitions and directional references were used in this disclosure:

Automobile: As used in this disclosure, an automobile is a road vehicle that is powered by an internal combustion engine. This definition is specifically intended to include vehicles generally referred to as pickup trucks.

Exterior Screw Thread: An exterior screw thread is a ridge wrapped around the outer surface of a tube in the form of a helical structure that is used to convert rotational movement into linear movement.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior Screw Thread: An interior screw thread is a ridge wrapped around the inner surface of a tube in the form of a helical structure that is used to convert rotational movement into linear movement Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Vehicle: As used in this disclosure, a vehicle is a device that is used transporting carrying passengers, goods, or equipment. The term motorized vehicle refers to a vehicle can move under power provided by an electric motor or an internal combustion engine.

Directional References: The directional references used in this disclosure correspond the directional reference from the perspective of the driver of a vehicle. The front 161 side is the side of the invention 100 that is closest to vehicle. The rear 162 side is the side of the invention 100 that is distal from the front 161 side. The bottom 164 side is the side of the invention 100 that is closest to the ground. The top side 163 of the invention 100 is the side of the invention 100 that is distal to the bottom 164 side. When viewed such that the rear 162 side is proximal to the viewer and the front 161 side is distal from the viewer, the left 165 side is the side of the invention 100 that is to the left of the viewer. The right 166 side is the side of the invention 100 that is distal from the left 165 side. In this disclosure, when the location of a first object and a second object are compared: 1) if the first object is closer to the top side than the second object, the first object is said to be above the second object and the second object is said to be below the first object; 2) if the first object is closer to the front side than the second object, the first object is said to be in front of the second object and the second object is said to be behind the first object; 3) if the first object is closer to the left side than the second object, the first object is said to be to the left of the second object and the second object is said to be to the right of the first object.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle fitting comprising:
   an adapter post, a receiving post, a mounting platform, a winch and a plurality of lights;
   wherein the vehicle fitting is adapted for use with a trailer hitch;
   wherein the vehicle fitting is a structure upon which a winch is mounted;
   wherein the adapter post is a square tube;
   wherein the adapter post is further defined with a first end and a second end;
   wherein the outer dimensions of the adapter post is less than the inner dimensions of the trailer hitch receiver;
   wherein the adapter post has formed in it a left adapter hole and a right adapter hole;
   wherein the receiving post is a square tube;
   wherein the receiving post is further defined with a third end and a fourth end;
   wherein the inner dimensions of the receiving post is greater than the outer dimensions of the adapter post;
   wherein the receiving post is sized such that the inner dimensions of the receiving post are the same size as the inner dimensions of the trailer hitch receiver;
   wherein the receiving post has formed into it a left receiver hole and a right receiver hole;
   wherein the second end of the adapter post is inserted into the third end of the receiving post;
   wherein the mounting platform comprises a supporting structure attached to a front ridge and a rear ridge; and a cable opening.

2. The vehicle fitting according to claim 1 wherein the supporting structure is a plate that further comprises a plurality of mounting holes.

3. The vehicle fitting according to claim 2 wherein the front ridge is a rim that runs along the front edge of the supporting structure.

4. The vehicle fitting according to claim 3 wherein the rear ridge is a rim that runs along the rear edge of the supporting structure.

5. The vehicle fitting according to claim 4 wherein the rear ridge further comprises a cable opening.

6. The vehicle fitting according to claim 5 wherein
   the cable opening is a rectangular projection projects away from the rear ridge such that the plane of the cable opening is perpendicular to the supporting structure;
   wherein the cable opening has a slot formed in it;
   wherein a cable from the winch is threaded through the slot.

7. The vehicle fitting according to claim 6 wherein
   the supporting structure is attached to the receiving post using a first L bracket;
   wherein supporting structure is attached to the receiving post using a second L bracket.

8. The vehicle fitting according to claim 7 wherein the first L bracket and second L bracket are positioned such that the receiving post is perpendicular to the front ridge and the rear ridge of the supporting structure.

9. The vehicle fitting according to claim 8 wherein each of the plurality of lights is a commercially available off road spotlight.

10. The vehicle fitting according to claim 9 wherein each LED off road spotlight is swivel mounted to the bottom surface of the supporting structure using a swivel mount.

11. The vehicle fitting according to claim 10 wherein the swivel mount comprises a nut, a threaded rod and a ball and socket joint.

12. The vehicle fitting according to claim 11 wherein the plurality of lights further comprises a first light and a second light.

* * * * *